May 12, 1964  J. D. LAWSON ETAL  3,133,214
LINEAR MOTION SENSING GENERATOR
Filed Jan. 4, 1960
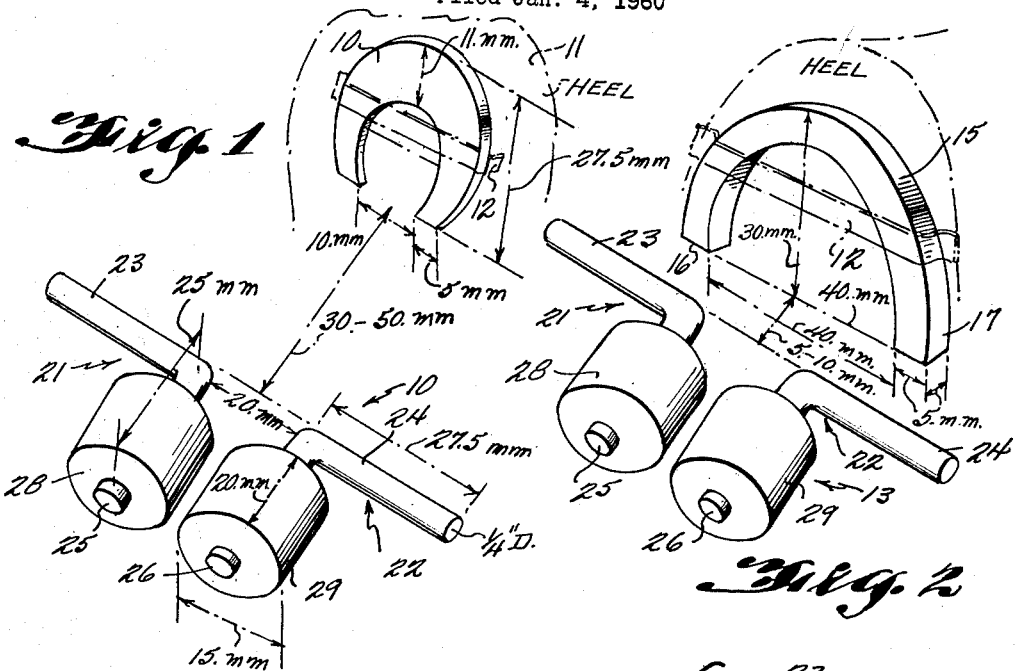
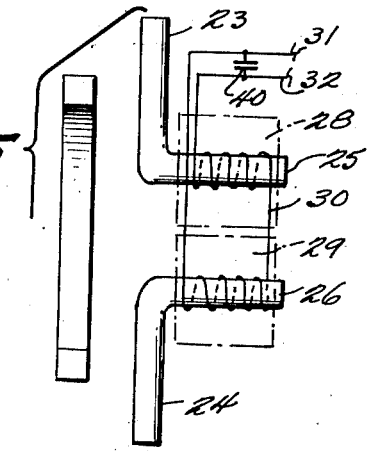
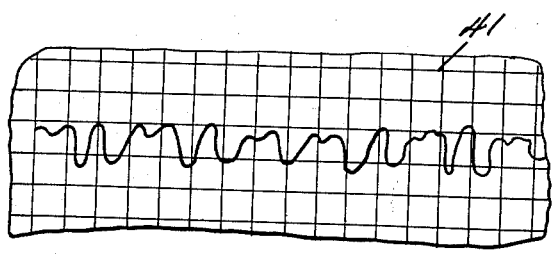
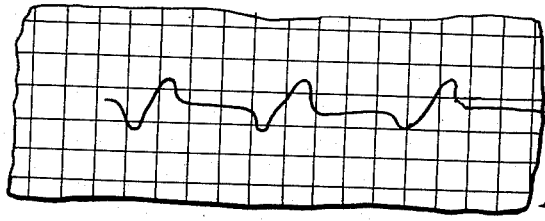
INVENTORS
JOHN D. LAWSON
LONNIE P. PARSONS, SR.
Kimmel & Crowell
ATTORNEYS

3,133,214
LINEAR MOTION SENSING GENERATOR
John D. Lawson, U.S. Army Hospital, Fort Rucker, Ala., and Lonnie P. Parsons, Sr., P.O. Box 6832, San Antonio 9, Tex.
Filed Jan. 4, 1960, Ser. No. 382
1 Claim. (Cl. 310—15)

This application is a continuation-in-part of our application for U.S. Letters Patent, Serial No. 686,142, filed September 25, 1957, and entitled Kinemometers.

The present invention relates generally to kinemometers and more particularly to kinemometers useful in medical diagonistics.

It is a primary object of the present invention to provide a device for detecting and measuring biological movement patterns of the type produced by muscular reflexes, respiratory movements and heart action.

It is another object of the invention to provide apparatus of the type above described which can be utilized with conventional recording galvanometers, such as the conventional electro-cardiographs, to provide recordings of body recoil movements.

Still another object of the invention is to provide a device for measuring movements of the body, or parts of the body, in terms of movements of a permanent magnet with respect to a sensing element.

It is another object of the invention to provide an apparatus of the class described above which is inexpensive to manufacture, simple to use and which will effectively measure one component of desired movement of a body, although in the presence of components of movements in three dimensions, to the practical exclusion of the other components, in order to assist in diagnosing certain medical conditions of the body.

It is still another object of the invention to provide a device for measuring movement of a permanent magnet in a direction toward and away from a sensing device, the system being arranged to produce essentially zero output in response to any motion or combination of motions other than motion of the magnet toward and away from the sensing device.

The above and still further objects, features and advantages of the present invention will become apparent upon consideration of the following detailed description of one specific embodiment thereof, especially when taken in conjunction with the accompanying drawings, wherein:

FIGURE 1 is a view in perspective of the first embodiment of the invention, employed when a considerable distance may exist between the foot of a patient and a sensing device;

FIGURE 2 is a view in perspective of a modification of the system of FIGURE 1, employed where a very slight distance is desired between the foot of a patient and a sensing device;

FIGURES 3 and 4 are charts of readings made by means of the system of the invention, for diagnostic purposes; and FIGURE 5 is a schematic representation of the permanent magnet and sensing device according to the invention, indicating the character of the coil windings in a sensing device of the type utilized in the systems of FIGURES 1 and 2.

Referring now more specifically to the accompanying drawings, wherein the same reference numerals are employed to identify corresponding parts, the reference numeral 10 denotes, in FIGURE 1, a permanent magnet of the horseshoe type which may be strapped or taped to the heel 11 of a patient, lying flat against the latter, preferably with the poles of the magnet pointing vertically downward and with the sole of the foot of the patient extending generally in a vertical direction. The toes of the patient may be placed upwardly or downwardly, although in FIGURE 1 they are shown as extending vertically downwardly, depending on the diagnostic purpose intended. The permanent magnet may also be secured to parts of the body other than the heel, as to the chest wall. The magnet 10 may be secured to the underside of the heel, as by means of tape 12. Dimensions of the magnet are indicated on the drawings, these dimensions representing dimensions which have been successfully employed in practice, where the distance between the poles of the magnet and a sensing device 13 is approximately 30 to 50 millimeters.

In FIGURE 2 of the accompanying drawings there is shown a modification of the system of FIGURE 1, wherein a horseshoe magnet 15 is utilized which is generally of U shape, shown in the inverted position, however, and which has poles 16 and 17. The magnet 15 may be attached to the heel of a patient in the same manner as the magnet in the modification of FIGURE 1, the dimensions of the magnet provided in the drawings representing a practical embodiment of the invention, when the magnet is to be utilized at a distance of 5 to 10 millimeters from the sensing device 13.

The sensing device 13 may be identical in the embodiments of my invention illustrated in both FIGURES 1 and 2, and consists essentially of two L-shaped members 21 and 22 fabricated of magnetic material, each having two arms 23, 24, and 25, 26. The arms 23, 25 are arranged to lie parallel to a line drawn between the poles of the magnet, and the arms 24, 26 extend perpendicularly of that line, the two perpendicular arms being separated by a distance of approximately 20 millimeters. Mounted on each of the latter arms is a coil, the coils being identified by reference numerals 28, 29 and having dimensions 1.5$_D$ by 2 centimeters in length. The windings of the two coils 28, 29 are as nearly identical as manufacturing tolerances will permit, and they lie as nearly as possible with their longitudinal axes parallel. As shown in FIGURE 5 of the accompanying drawings, the coils are wound in directions such that the voltages induced therein will be additive in response to movements of the pole pieces 16 and 17 toward the arms 23, 24, respectively. It will be noted that the direction of winding of each of the coils is the same when viewed from the end of the arms, but that the ends of the coils adjacent to the ends of the arms are connected together, by a conductor 30. Tracing through the coils from one output terminal 31, to the other, 32, accordingly, and thereby proceeding in opposite directions along the coils, the actual winding directions of the coils are opposite. Accordingly, when a magnet having a north pole 16 adjacent arm 23 and a south pole 17 adjacent arm 24 is brought toward or away from the arms, the voltages induced in the coils are additive. When, however, the magnet is moved so that it has only components of motion which do not approach or recede from the poles, essentially no net change is effected in the magnetic field between the pole pieces 16 and 17 and the L-shaped members 21, 22, respectively and accordingly no significant voltage is induced in the coils, and no significant signal appears at the output terminals 31, 32. Only a component of motion toward or away from the line joining the poles 16 and 17 of the magnet induces a significant output voltage at terminals 31, 32.

In the case of the system of FIGURE 2, the effect described in the preceding paragraph occurs because the poles are spaced approximately mid-way of the arms, are closely located thereto, and the arms extend outwardly beyond the poles. In the modification of FIGURE 1, on the other hand, a considerably greater distance exists between the respective poles and the arms 23 and 24 and accordingly the situation that the magnetic field of the magnet, at the arms 23, 24, is tangential to the arms is an important factor. Lateral movement of the poles 16 and 17 does not appreciably alter the magnetic field existing at the arms 23 and 24, respectively, but motion of the magnet 15 toward the arms, which has square law effect, produces a considerable variation in the net magnetic flux through the arms and accordingly on the net voltage induced in the coils.

The manner of winding of the coils 28 and 29 on the other hand gives rise to the result that any extraneous magnetic field present adjacent to the coils will traverse both coils equally and will therefore induce equal and opposite voltages in the two coils, which will balance at the output terminals 31, 32, resulting in a zero output from the system in response to extraneous varying magnetic fields, such as may be caused by currents in the house wiring, or by currents flowing to adjacent equipment or due to currents in measuring equipment adjacent to the equipment of the present invention.

In the use and operation of the invention, the magnet 11 is taped by an adhesive tape strip 12 to the base of the heel 11 of the patient. The Achilles tendon is then struck sharply at point 36, and the resultant reflex motion can be detected at the output terminals 31 and 32 of the sensing device, and recorded on an electro-cardiographic record chart, as illustrated in FIGURES 3 and 4, or on some equivalent recording galvanometer. The system may be employed as a ballistocardiograph by observing heel motion, without inducing a reflex action, in which case the modification of FIGURE 2 is preferred.

While the invention has been illustrated as applied to the heels of a patient, similar results may be accomplished in respect to the chest wall of a patient and the equipment may be utilized as a ballistocardiograph to examine the effects of the heart's contraction. In general, when the system is utilized as a diagnostic instrument, the working distance between the permanent magnet and the sensing device is very slight in ballistocardiography and a relatively wide magnet 15 is utilized, as in FIGURE 2, so that the magnetic poles are near the center of the co-linear arms of the cores. To clinically record the Achilles reflex on the other hand a stronger magnet is employed and the distance from the magnet to the sensing device is approximately 30 to 50 millimeters.

It is important that the coils 28, 29 be identical, and parallel, and they are in a preferred embodiment of the invention of approximately 100 milli-henries inductance. To the extent that the coils are not identical ambient varying magnetic fields will cause a false reading. In consequence of the recited arrangement, extensive shielding of the device is unnecessary, which effects a considerable saving in cost and weight of equipment.

Another problem which is encountered in equipment of this type is due to the fact that upon striking the Achilles tendon vibrations are set up in the tendon and associated ligaments. These vibrations are in the plane of movement and therefore may become superimposed on the smooth reflex curve. In order to remove the Achilles tendon vibrations, I utilize a 500 micro-farad condenser 40 connected across the output terminals 31, 32. The presence of this condenser causes a slight lag in response of the equipment, of the order of 40 milli-seconds, but since the lag is known, it may be taken into account readily in effecting a diagnosis. This lag is precisely equal to the time required for one square 41 of standard electrocardiographic paper to pass the record pen, which simplifies mental compensation of the lag effect.

While we have described and illustrated one specific embodiment of our invention, it will be clear that variations of the details of construction, which are specifically illustrated and described, may be resorted to without departing from the true spirit and scope of the invention as defined by the appended claim.

What we claim is:

In an electro-magnetic diagnostic apparatus, a U-shaped permanent magnet mounted in inverted position and susceptible to mechanical vibrations, a sensing device comprised in part by arms of magnetic material having their axes spaced in parallel relationship at right angles to the line of the pole ends of the U-shaped permanent magnet and respectively extending between the vertical center line and a pole end of the latter, and oppositely disposed arms of magnetic material respectively integral with the first arms positioned in parallel relationship and co-planar with the line between the pole ends of the U-shaped permanent magnet and forming a shunt path for magnetic flux lines between the pole ends, and pick-up coils connected in series and in additive electromotive force relationship mounted respectively on the first arms.

References Cited in the file of this patent
UNITED STATES PATENTS
2,507,708    Greener  ---------------- May 16, 1950
2,684,671    Mendelsohn  ---------- July 27, 1954